(12) United States Patent
Schoen et al.

(10) Patent No.: US 11,435,053 B2
(45) Date of Patent: Sep. 6, 2022

(54) COVER FOR AN EXTERIOR AIRCRAFT LIGHT, EXTERIOR AIRCRAFT LIGHT, AND METHOD OF DETERMINING A WEAR STATE OF A LENS COVER STRUCTURE

(71) Applicant: Goodrich Lighting Systems GmbH, Lippstadt (DE)

(72) Inventors: Christian Schoen, Mainz (DE); Andre Hessling-Von-Heimendahl, Koblenz (DE); Bjoern Schallenberg, Geseke (DE)

(73) Assignee: GOODRICH LIGHTING SYSTEMS GMBH, Lippstadt (DE)

(*) Notice: Subject to any disclaimer, the term of this patent is extended or adjusted under 35 U.S.C. 154(b) by 0 days.

(21) Appl. No.: 17/169,821

(22) Filed: Feb. 8, 2021

(65) Prior Publication Data

US 2021/0164634 A1 Jun. 3, 2021

Related U.S. Application Data

(63) Continuation of application No. 16/443,061, filed on Jun. 17, 2019, now Pat. No. 10,914,446.

(30) Foreign Application Priority Data

Jun. 19, 2018 (EP) .................................... 18178533

(51) Int. Cl.
*F21S 43/20* (2018.01)
*B64D 47/04* (2006.01)
*B64D 47/06* (2006.01)
*F21V 17/00* (2006.01)

(52) U.S. Cl.
CPC .............. *F21S 43/26* (2018.01); *B64D 47/04* (2013.01); *B64D 47/06* (2013.01); *F21V 17/002* (2013.01)

(58) Field of Classification Search
CPC ......... F21S 43/26; B64D 47/04; B64D 47/06; B64D 2045/009; B64D 2203/00;
(Continued)

(56) References Cited

U.S. PATENT DOCUMENTS 5,228,478 A ‡ 7/1993 Kleisle ..................... F16L 57/06
116/20
6,669,357 B2 ‡ 12/2003 Konicke ................. B64D 47/04
244/1 R
(Continued)

FOREIGN PATENT DOCUMENTS

EP 3073249 A1 ‡ 9/2016 ............. B64D 47/06
EP 3073249 A1 9/2016
(Continued)

OTHER PUBLICATIONS

Extended European Search Report for International Application No. 18178533.8 dated Sep. 10, 2018, 7 pages.‡

*Primary Examiner* — Tracie Y Green
(74) *Attorney, Agent, or Firm* — Cantor Colburn LLP

(57) ABSTRACT

A cover for an exterior aircraft light includes a lens cover structure, attachable to an exterior aircraft light housing and configured to close the exterior aircraft light housing, wherein the lens cover structure has an inside and an outside and is at least partially made of transparent material; and a wear indicator, attached to the inside of the lens cover structure, the wear indicator having a contrasted pattern visible from the outside of the lens cover structure through the transparent material.

18 Claims, 7 Drawing Sheets

(58) Field of Classification Search
CPC .. B64D 45/00; F21V 17/002; G01N 21/8803; G01N 21/958
See application file for complete search history.

(56) References Cited

U.S. PATENT DOCUMENTS

| | | | | |
|---|---|---|---|---|
| 9,090,341 | B2 * | 7/2015 | Edmond | B64C 23/069 |
| 9,889,948 | B2 * | 2/2018 | Hessling von Heimendahl | B64D 47/02 |
| 10,464,692 | B2 ‡ | 11/2019 | Jha | B64D 47/02 |
| 10,851,945 | B2 * | 12/2020 | Glaesemann | B32B 15/00 |
| 10,914,446 | B2 * | 2/2021 | Schoen | G01N 21/8803 |
| 2012/0132129 | A1 ‡ | 5/2012 | Edmond | B64D 45/00 116/20 |
| 2016/0280395 | A1 ‡ | 9/2016 | Jha | B64D 47/06 |
| 2017/0233101 | A1 ‡ | 8/2017 | Hessling-Von Heimendahl | F21V 7/0091 362/470 |
| 2019/0063713 | A1 ‡ | 2/2019 | Hessling-Von Heimendahl | F21S 41/32 |
| 2019/0383462 | A1 | 12/2019 | Schoen et al. | |

FOREIGN PATENT DOCUMENTS

| | | | | |
|---|---|---|---|---|
| EP | 3095709 A1 ‡ | 11/2016 | | H05B 45/58 |
| EP | 3095709 A1 | 11/2016 | | |
| EP | 3181459 A1 ‡ | 6/2017 | | F21V 7/0091 |
| EP | 3181459 A1 | 6/2017 | | |
| EP | 3269649 A1 ‡ | 1/2018 | | B64D 47/02 |
| EP | 3269649 A1 | 1/2018 | | |

\* cited by examiner
‡ imported from a related application

COVER FOR AN EXTERIOR AIRCRAFT LIGHT, EXTERIOR AIRCRAFT LIGHT, AND METHOD OF DETERMINING A WEAR STATE OF A LENS COVER STRUCTURE

CROSS REFERENCE TO RELATED APPLICATIONS

This application is a Continuation application of U.S. application Ser. No. 16/443,061, filed on Jun. 17, 2019 which claims priority to European Patent Application No. 18178533.8 filed Jun. 19, 2018, the entire contents of both applications which are incorporated herein by reference.

TECHNICAL FIELD

The present invention relates to exterior aircraft lighting. In particular, it relates to the maintenance of exterior aircraft lights.

BACKGROUND

Almost all aircraft are equipped with exterior lighting systems. For example, large commercial aircraft have many different exterior lights. An exemplary group of exterior aircraft lights are lights for passive visibility, such as navigation lights, white strobe anti-collision lights, and red-flashing beacon lights. Another exemplary group of exterior aircraft lights are headlights that allow the pilots to view the area in front of them, when they are seated in the cockpit, such as taxi lights, take-off lights, landing lights, and runway turn-off lights. Yet another example of exterior aircraft lights are scan lights that allow the inspection of the aircraft structure in the dark, such as wing scan lights.

Exterior aircraft lights work in a highly demanding environment. They are exposed to large temperature variations, high mechanical stresses, and to the airstream with its impinging particles. As a consequence, the covers of exterior aircraft lights, often referred to as lens covers, degrade in operation and are replaced in the course of aircraft maintenance.

Accordingly, it would be beneficial to provide a cover for an exterior aircraft light that allows for an improved maintenance of the exterior aircraft light and to provide an exterior aircraft light equipped with such cover. Further, it would be beneficial to provide a method of determining a wear state of a lens cover structure.

SUMMARY

Exemplary embodiments of the invention include a cover for an exterior aircraft light, comprising a lens cover structure, attachable to an exterior aircraft light housing and configured to close the exterior aircraft light housing, wherein the lens cover structure has an inside and an outside and is at least partially made of transparent material; and a wear indicator, attached to the inside of the lens cover structure, the wear indicator comprising a contrasted pattern visible from the outside of the lens cover structure through the transparent material.

Exemplary embodiments of the invention allow for a reliable detection of the wear state of the lens cover structure of an exterior aircraft light and, thus, for a timely maintenance of the lens cover structure and an ongoing safe operation of the exterior aircraft light. As laid out above, the lens cover structure of an exterior aircraft light may degrade over time due to the impinging particles of the airstream in flight. This degradation may also be seen as an erosion of the outside of the transparent material of the lens cover structure. Optically, the erosion of the outside of the lens cover structure leads to light from the inside of the lens cover structure not being refracted in a specular manner, when passing through the lens cover structure, but being refracted in a diffuse manner. In other words, the erosion of the lens cover structure leads to the originally transparent material becoming a more and more diffusely refracting translucent material. The change of the lens cover structure from a transparent material to a diffusely refracting translucent material leads to the contrasted pattern becoming blurry when viewed from the outside of the lens cover structure through the transparent material. The blurriness of the contrasted pattern thus indicates that the lens cover structure has degraded. This in turn means that the desired light output of the exterior aircraft light, which relies on the lens cover structure having a high level of transparency and having little or no diffusely refractive impact on the light output of the exterior aircraft light, may no longer be according to specification.

The wear indicator, having a contrasted pattern on the inside of the lens cover structure, forms an objective criterion for determining the state of wear of the lens cover structure. For example, for a given lens cover structure, an objective determination may be made on the basis of an inspection of a particular contrasted pattern from a particular distance from the lens cover structure. If the contrasted pattern is blurry and its pattern elements are no longer discernible from the predefined distance, this may indicate that the level of degradation is so severe that the lens cover structure is to be replaced. As compared to previous approaches where the pilots and/or ground personnel performed a rough visual inspection of the lens cover structures of exterior aircraft lights without any objective measure, the cover of exemplary embodiments of the invention allows for an objective, reliable determination of the state of wear of a lens cover structure. This determination may be carried out visually by the pilots and/or ground personnel in an objective, documentable manner or also in an automated manner via camera-based systems, taking images of the lens cover structures of exterior aircraft lights. The cover in accordance with exemplary embodiments of the invention has a built-in/integrated wear indicator, which allows for a reliable, objective determination of the state of wear without additional tools or gauges.

The cover may be configured for an exterior aircraft light that has an exterior aircraft light housing, at least one light source, and an optical system for conditioning a light output of the exterior aircraft light. The exterior aircraft light housing and the cover may form an inner space of the exterior aircraft light, in which the at least one light source and the optical system are arranged. The at least one light source and the optical system may direct the light emitted by the at least one light source towards the transparent material of the lens cover structure, such that a desired output light intensity distribution, as shaped by the optical system, leaves the exterior aircraft light substantially unimpeded by the lens cover structure. It is pointed out that it is also possible to use the lens cover structure as an optically active element, namely as an additional lens and/or as a shutter, contributing to the shaping of the desired output light intensity distribution.

The lens cover structure is a support structure for the wear indicator. In other words, the lens cover structure may form the mechanical support for the wear indicator and, thus, for the contrasted pattern. Also, the lens cover structure has sufficient mechanical strength to bridge an open side of the exterior aircraft light housing and to protect the inside of the exterior aircraft light during flight. In particular, the lens cover structure is configured to protect the at least one light source and the optical system from the airstream and its impinging particles.

The lens cover structure is configured to close the exterior aircraft light housing. In particular, the lens cover structure may have a shape that allows for a sealing attachment of the lens cover structure to the exterior aircraft light housing. Also, the lens cover structure may be provided with attachment elements configured for effecting or enabling an attachment between the cover and the exterior aircraft light housing. The attachment elements may comprise one or more of attachment clips, projections, recesses, holes for attachment screws/bolts, etc. With the help of such attachment elements, the exterior aircraft light housing and the cover may be fixed in position with respect to each other.

The lens cover structure is at least partially made of transparent material. The term at least partially made of transparent material is to be understood in a way that the lens cover structure has one or more portions that are made of transparent material and that, thus, allow light to propagate from the inside to the outside through the lens cover structure and vice versa. In particular, the transparent material allows light from a light source within the exterior aircraft light to propagate through the lens cover structure and to provide the light output of the exterior aircraft light. The transparent material is understood as originally transparent material or as initially transparent material, i.e. as a material that initially allows for specular refraction of light, travelling through the lens cover structure. As laid out above, due to erosion of the lens cover structure, the originally transparent material may become diffusely refractive over time. It is this deviation of the originally transparent nature of the transparent material that is subject to inspection via the wear indicator. The lens cover structure may be made entirely of transparent material or may be combined of portions of transparent material and portions of non-transparent material.

The wear indicator comprises a contrasted pattern visible from the outside of the lens cover through the transparent material. The contrasted pattern may be defined as a set of pattern features that are discernable from each other when viewed through the transparent material. Given the curvature and thickness of the transparent material overlaying the contrasted pattern, the extensions of the features may be adapted to the particular lens cover structure, in order to be discernable from the outside of the lens cover structure. The contrasted pattern may have pattern features of high contrast arranged next to each other, in order to allow for a convenient and quick visual inspection of the pattern features. A high contrast may for example be given if the contrasted pattern has at least two colors that have a high saturation and a high relative hue angle. In particular, a high contrast may be given if two colors of the contrasted pattern both have a saturation of at least 50% and a hue angle of at least 50° with respect to each other. The stated parameters may be calculated in accordance with the HSV color representation scale/system. In the case of the contrasted pattern being a monochromatic pattern, i.e. in case of the contrasted pattern being comprised of black, white and/or grey shades, a high contrast may be given for the V parameter in the HSV system being above 50%.

According to a further embodiment, the contrasted pattern comprises at least one of a stripe pattern, a checkered pattern, and a Siemens star pattern. In particular, the contrasted pattern may be a stripe pattern or a checkered pattern or a Siemens star pattern. Each of a stripe pattern, a checkered pattern, and a Siemens star pattern has pattern features that are easily discernible from each other. For example, a stripe pattern may have stripes of different colors arranged next to each other, with the different colors of the stripes leading to the individual stripes being discernible by the observer. In a checkered pattern, the individual fields may be discernible from each other. In a Siemens star pattern, the individual sectors of the circular or disk-shaped Siemens star pattern are discernible from each other. Accordingly, all of these patterns allow for an inspection and a determination whether their geometric features, which are clearly discernible behind a transparent material, are blurred by the overlaying lens cover structure due to erosion thereof.

According to a further embodiment, the contrasted pattern is a repetitive pattern. In other words, a general type of pattern elements may be repeated in the contrasted pattern. For example, an alternating pattern of stripes of different colors is such a repetitive pattern. The alternating arrangement of disk sectors of a Siemens star is another example of a repetitive pattern. It is pointed out that the repeated pattern elements may have the same extensions/widths throughout the pattern or may have a changing extension/width along the pattern, with the changing extension/width also being referred to as a changing resolution of the pattern. The provision of a repetitive pattern allows for the provision of an extended area for inspection of the state of wear of the lens cover structure. In this way, highly localized effects, such as a localized damage of the lens cover structure or a localized dirt built-up on the lens cover structure, which are not due to the general erosion of the lens cover structure, may be disregarded, and a reliable determination of the wear state may still be achieved.

According to a further embodiment, the contrasted pattern has pattern portions of differing resolutions. In other words, the widths/extensions of the pattern elements may differ along the contrasted pattern. In this way, the state of wear of the lens cover structure may be determined on a scale having a plurality of measurement points. For example, the contrasted pattern may have a first pattern portion of a first resolution and a second pattern portion of a second resolution. Depending whether the pattern elements are discernible in none of the pattern portions or in only one of the pattern portions or in both of the pattern portions, when viewed in a predefined manner, a quantitive determination with respect to the degradation of the lens cover structure may be made. In particular, the contrasted pattern may have pattern portions of steadily increasing or steadily decreasing resolution. Such an arrangement may provide for an extended scale with respect to the degradation of the lens cover structure. The term resolution may refer to the width/extension of individual pattern elements, which may also be referred to as the pitch between pattern elements. For the example of a stripe pattern, a varying pitch between alternating stripes may form pattern portions of differing resolutions. For the Siemens star, pattern portions of differing resolutions are an inherent property. With increasing distance from the center of the Siemens star, the absolute widths of the adjacent pattern elements increase.

According to a further embodiment, the wear indicator has a maintenance indication marker, marking a first portion of the contrasted pattern, having a first resolution. The maintenance indication marker may be understood by the inspecting person in a manner that, if the pattern elements of the first resolution are no longer discernable from each other, the lens cover structure is to be replaced. While such a maintenance indication marker is not necessary, but may be implicitly agreed upon via an according convention of how to understand the extent of blurriness of the contrasted pattern, the maintenance indication marker is an efficient way of clearly indicating to the inspecting person that maintenance is now required. The inspection of the lens cover structure is thus possible with high accuracy and little room for error.

According to a further embodiment, the wear indicator has a non-critical wear indication marker, marking a second portion of the contrasted pattern, having a second resolution. In particular, the second resolution may be smaller than the first resolution, associated with the maintenance indication marker. Such a non-critical wear indication marker may indicate that, if the pattern elements with the second resolution are discernible by the inspecting person, the wear of the lens cover structure is at a non-critical level. While not being required for reliably scheduling maintenance of the lens cover structure, the non-critical wear indication marker is beneficial for a quick and reliable determination of the state of wear, because the inspecting person can make a very quick and positive check of the lens cover structure still working in an acceptable manner. Also, with the presence of the non-critical wear indication marker and the maintenance indication marker, the combined information about the discernibility of the pattern elements of the first resolution and the second resolution allows for the determination that a replacement of the lens cover structure will have to be carried out soon. In this way, the combined presence of the maintenance indication marker and the non-critical wear indication marker allows for an effective scheduling of maintenance intervals and, potentially, of an efficient lining up of different maintenance operations across the aircraft.

According to a further embodiment, the contrasted pattern comprises a first stripe pattern, having a first pitch, and a second strip pattern, having a second pitch, the second pitch being larger than the first pitch. The provision of two stripe patterns with differing pitches is an efficient implementation of a contrasted pattern having two portions of differing resolutions. Each of the stripe patterns may have a constant pitch/constant resolution. In this way, the contrasted pattern may provide two measures of the degradation of the lens cover structure. As laid out above, the two measurements may be associated with a maintenance indication on the hand and a non-critical wear indication on the other hand. The inspecting person may read the two indications in the following manner. If both stripe patterns are discernible, the wear of the lens cover structure is at a non-critical level. If the second stripe pattern is discernible, but the first stripe pattern is not, the lens cover structure has substantially degraded, but is still ok to use. The inspecting person may interpret this result as a need for an upcoming replacement of the lens cover structure. If neither the first stripe pattern nor the second stripe pattern are discernible by the inspecting person, the cover is to be replaced. In an exemplary embodiment, the first pitch may be 1 mm and the second pitch may be 2 mm. It is apparent that these values are exemplary only and that suitable values for the first pitch and the second pitch depend on a number of factors, such as the thickness of the transparent material, the viewing distance for the inspection of the lens cover structure, and the level of degradation that is deemed acceptable for a particular exterior aircraft light.

According to a further embodiment, the contrasted pattern is a black and white pattern. A black and white pattern provides a particularly high contrast between the different pattern elements. This in turn allows for a very reliable determination if the pattern elements are still discernible from each other, given the current state of degradation of the lens cover structure. Black and white are particularly suitable colors for the contrasted pattern, as they provide for a very high contrast ratio.

According to a further embodiment, the black and white pattern is arranged on a grey background. With a blurring of the black and white pattern leading to a perception of a grey structure, the grey background makes the determination whether or not the pattern elements are discernible even more easy. In particular, if no substantial difference can be perceived between the blurred black and white pattern and the surrounding grey area, it can be reliably determined that the pattern elements are no longer discernible from each other.

According to a further embodiment, the wear indicator has an extension of between 2 cm and 10 cm, in particular of between 4 cm and 6 cm, further in particular of around 5 cm. The term extension refers to the extent of coverage of the transparent material by the wear indicator on the inside of the lens cover structure. The extension of the wear indicator may be measured as the direction of longest extension for a non-regular structure or may be measured as the dimension of longest extension in case of the wear indicator having a regular structure. For example, in case of the wear indicator having a rectangular structure, the term extension refers to the long side of the rectangular structure. In a particular example, the wear indicator may have a rectangular structure of about 5 cm×about 2.5 cm. The given sizes of the wear indicator allow for a favorable compromise between conveniently being viewed by the inspecting person and being placeable in regions of the lens cover structure where the wear indicator has little or no impact on the light output of the exterior aircraft light.

According to a further embodiment, the wear indicator is a sheet-like or substantially two-dimensional structure. As such, it may be applied to the lens cover structure without taking up much volume within the interior of the exterior aircraft light.

According to a further embodiment, the wear indicator is a sticker adhered to the inside of the lens cover structure. In this way, the wear indicator can be applied conveniently and quickly to the lens cover structure during manufacture thereof.

It is pointed out that the exemplary embodiments of the wear indicator, as described above, may allow for a quick and cost-effective production and assembly to the lens cover structure. In this way, the wear indicator can be easily integrated into the cover and can be discarded together with the cover during replacement thereof, without being a big loss in terms of resources or cost.

Exemplary embodiments of the invention further include an exterior aircraft light comprising an exterior aircraft light housing; at least one light source, arranged within the exterior aircraft light housing; an optical system, configured for conditioning a light output of the exterior aircraft light from light emitted by the at least one light source; and a cover according to any of the embodiments above, attached to the exterior aircraft light housing. The additional features, modifications, and beneficial effects, described above with respect to the cover in accordance with exemplary embodiments of the invention, apply to the exterior aircraft light in accordance with exemplary embodiments of the invention in an analogous manner.

According to a further embodiment, the at least one light source and the optical system are arranged to direct light from the at least one light source through a light emission portion of the transparent material of the lens cover structure. The wear indicator may be attached to a wear indication portion of the transparent material of the lens cover structure, different from the light emission portion. In this way, the wear indicator may be placed in a position where it has little or no effect on the light intensity distribution, as created by the at least one light source and the optical system and as emitted by the exterior aircraft light.

According to a further embodiment, the at least one light source is or comprises at least one LED.

According to a further embodiment, the exterior aircraft light is one of a wing tip navigation light, a wing tip white-flashing anti-collision light, a landing light, a runway turn-off light, a taxi light, a take-off light, and a red-flashing beacon light. With these kinds of exterior aircraft lights, which are usually subject to the airstream during flight, the cover in accordance with exemplary embodiments of the invention allows for a particularly beneficial determination of the wear state thereof. In particular, the covers of these lights may be replaced in a much more objective and targeted manner, as compared to previous subjective approaches. Also, the wear indicator being placed in a predefined position of the exterior aircraft light in question, a consistent determination of the degradation across the exterior aircraft lights of different aircraft, such as over a whole fleet of aircraft, may be achieved. In this way, the maintenance intervals and the flying safety of the aircraft fleet may be improved. It is pointed out that the terms wing tip navigation light, a wing tip white-flashing anti-collision light, a landing light, a runway turn-off light, a taxi light, a take-off light, and a red-flashing beacon light refer to exterior aircraft lights having at least the stated functionality. However, each term encompasses exterior aircraft lights having the stated functionality and one or more additional functionalities. For example, the term wing tip navigation light encompasses a combined wing tip navigation and white-flashing anti-collision light.

Exemplary embodiments of the invention further include a set of a lens cover structure that is attachable to an exterior aircraft light housing and configured to close the exterior aircraft light housing, wherein the lens cover structure has an inside and an outside and is at least partially made of transparent material, and a wear indicator comprising a contrasted pattern visible through the transparent material of the lens cover structure. The wear indicator of the set, comprising the lens cover structure and the wear indicator, may be attachable to the lens cover structure. In this way, a cover in accordance with any of the embodiments, as described above, may be provided. However, it is also possible that the wear indicator is configured to be attached to another portion of the exterior aircraft light, such as to the exterior aircraft light housing. In other words, it is not essential that the wear indicator is attached to the inside of the lens cover structure. It may also be arranged somewhere else within the exterior aircraft light. The additional features, modifications, and beneficial effects, described above with respect to the cover in accordance with exemplary embodiments of the invention, apply to the set of the lens cover structure and the wear indicator in an analagous manner.

Exemplary embodiments of the invention further include an exterior aircraft light comprising an exterior aircraft light housing; at least one light source, arranged within the exterior aircraft light housing; an optical system, configured for conditioning a light output of the exterior aircraft light from light emitted by the at least one light source; a lens cover structure, attachable or attached to the exterior aircraft light housing and configured to close the exterior aircraft light housing, wherein the lens cover structure has an inside and an outside and is at least partially made of transparent material; and a wear indicator arranged within the exterior aircraft light, the wear indicator comprising a contrasted pattern visible from the outside of the lens cover structure through the transparent material. The wear indicator may be spaced from the lens cover structure. The additional features, modifications, and beneficial effects, as described above with respect to the cover in accordance with exemplary embodiments of the invention and with respect to the exterior aircraft light in accordance with exemplary embodiments of the invention, apply to such embodiments of the exterior aircraft light in an analagous manner.

Exemplary embodiments of the invention further include an aircraft, such as an airplane or a helicopter, having at least one exterior aircraft light, as described in any of the embodiments above. The additional features, modifications, and beneficial effects, described above with respect to the cover in accordance with exemplary embodiments of the invention and with respect to the exterior aircraft light in accordance with exemplary embodiments of the invention, apply to the aircraft in accordance with exemplary embodiments of the invention in an analagous manner.

Exemplary embodiments of the invention further include a method of determining a wear state of a lens cover structure of an exterior aircraft light, the method comprising: inspecting the lens cover structure, which is provided on its inside with a wear indicator having a contrasted pattern, from its outside; determining an extent of blurriness of the contrasted pattern when inspected through the lens cover structure; and determining the wear state of the lens cover structure on the basis of the extent of blurriness of the contrasted pattern. The additional features, modifications, and beneficial effects, described above with respect to the cover in accordance with exemplary embodiments of the invention, apply to the method of determining a wear state of the lens cover structure in accordance with exemplary embodiments of the invention in an analagous manner. Method steps analogous to the apparatus features described above are explicitly disclosed herewith.

The method of determining a wear state of a lens cover structure in accordance with exemplary embodiments of the invention may be carried out by an inspecting person, such as by a pilot or by ground personnel, or may be carried out automatically, e.g. with a camera taking an image of the lens cover structure in question.

According to a further embodiment, the step of determining the wear state of the lens cover structure comprises making a decision whether the lens cover structure is to be replaced.

According to a further embodiment, the contrasted pattern comprises a stripe pattern and the step of determining an extent of blurriness of the contrasted pattern comprises determining whether individual stripes of the stripe pattern are discernible at a predefined distance from the lens cover structure.

BRIEF DESCRIPTION OF THE DRAWINGS

Further exemplary embodiments of the invention will be described below with respect to the accompanying Figures, wherein.

DETAILED DESCRIPTION

Figure 1:
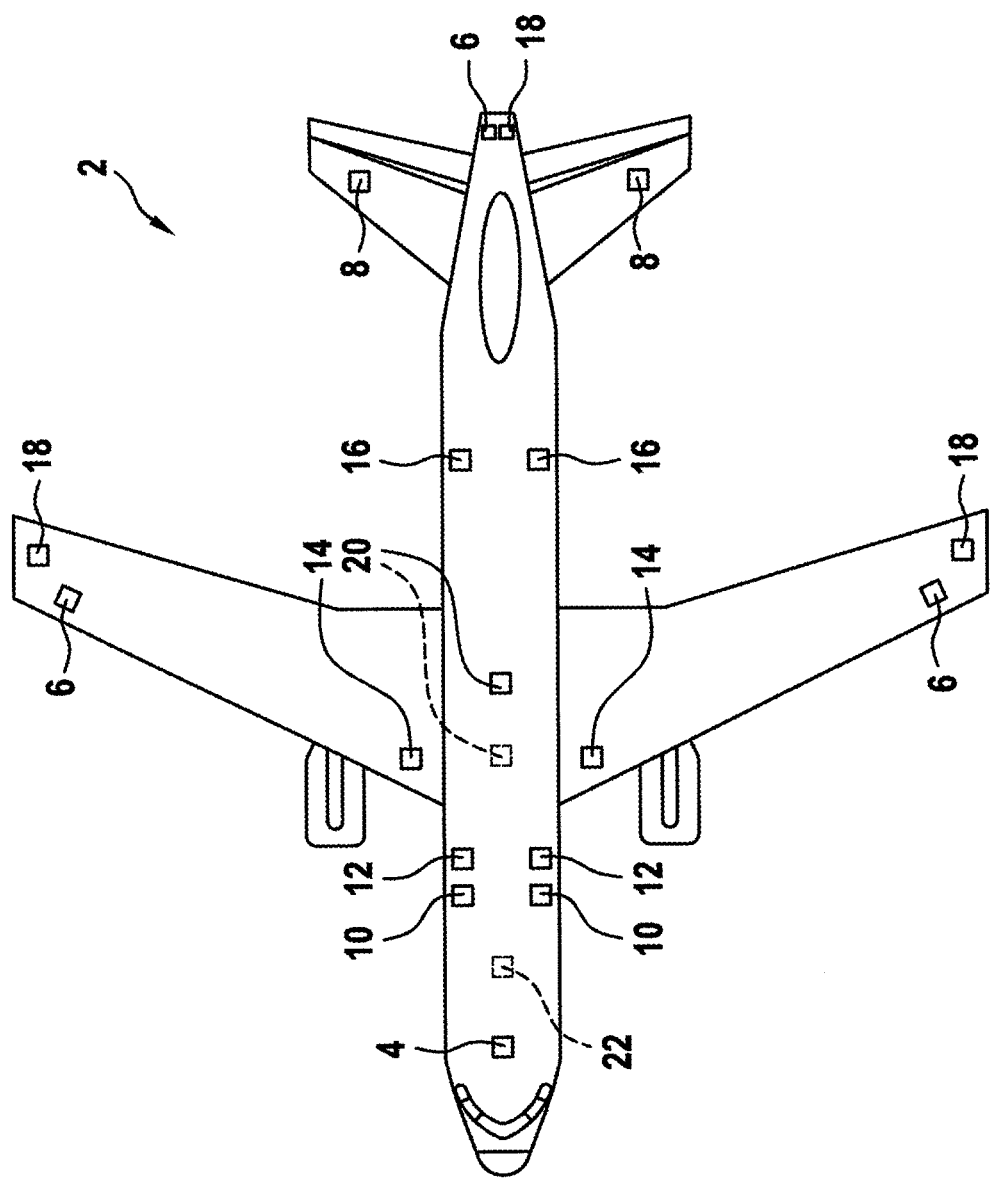
FIG. 1 shows an aircraft in accordance with an exemplary embodiments of the invention, equipped with exterior aircraft lights in accordance with exemplary embodiments of the invention, in a schematic top view.

FIG. 1 shows an aircraft 2 in accordance with an exemplary embodiment of the invention. The aircraft 2 of FIG. 1 is shown with various components of an exterior aircraft lighting system of the aircraft 2. The exterior aircraft lighting system comprises a control unit 4 and a variety of exterior aircraft lights. The control unit 4 is configured to control the exterior aircraft lights of the aircraft 2. The aircraft 2 is an air plane in the exemplary embodiment of FIG. 1.

The aircraft 2 of FIG. 1 has a wide variety of exterior aircraft lights. In particular, the aircraft 2 has three navigation lights 6, two logo lights 8, two wing scan lights 10, two engine scan lights 12, two runway turn-off lights 14, two cargo loading lights 16, three white-flashing anti-collision lights 18, two red-flashing beacon lights 20, and a landing light 22. It is pointed out that these kinds of lights and their numbers are exemplary only and that the aircraft 2 may have additional lights that are not shown, such as taxi lights.

The three navigation lights 6 are positioned in the left and right wing tips as well as the tail of the aircraft 2. In normal flight conditions, each one of the navigation lights 6 emits light in one of the colors green, red and white, thus indicating to the aircraft environment if they are looking at the port side, starboard side or tail side of the aircraft. The navigation lights are normally on during all phases of the flight and in all flight conditions.

The logo lights 8 are directed to the vertical stabilizer of the aircraft 2 and are provided for illuminating the same, in particular for illuminating the logo commonly provided on the vertical stabilizer. The logo lights 8 are normally switched on for the entire duration of the flight during night flights. It is also possible that the logo lights are only used during taxiing on the airport and are normally switched off during the flight.

The wing scan lights 10 and the engine scan lights 12 are positioned on the left and right sides of the aircraft fuselage, in front of the roots of the wings of the aircraft 2. The wing scan lights 10 and the engine scan lights 12 are normally off during the flight and may be switched on periodically or upon reasonable cause by the pilots or by the aircrew, in order to check the wings and the engines of the aircraft 2. The runway turn-off lights 14 are positioned in the roots of the wings. They are directed forwards and are normally switched off during the flight and switched on during taxiing, at least at night. The cargo loading lights 16 are positioned on the left and right sides of the aircraft fuselage, behind the wings and in front of tail structure of the aircraft 2. They are normally switched off during the flight of the aircraft 2.

The white-flashing anti-collision lights 18 are positioned in the left and right wing tips as well as at the tail of the aircraft 2. The white-flashing anti-collision lights 18 emit respective sequences of white light flashes during normal operation of the aircraft 2. It is also possible that the white-flashing anti-collision lights 18 are only operated during night and bad weather conditions. The red-flashing beacon lights 20 are positioned on the top and the bottom of the fuselage of the aircraft 2. They are arranged at the height of the wings in the longitudinal direction of the aircraft 2. While one of the red-flashing beacon lights 20 is disposed on the top of the fuselage, the other one of the red-flashing beacon lights 20 is disposed on the bottom of the fuselage and is therefore shown in phantom. The red-flashing beacon lights 20 are normally switched on during the flight. Their output is perceived as a sequence of red light flashes in a given viewing direction.

The landing light 22 is attached to the front running gear of the aircraft 2, which is normally stored within the fuselage and is deployed during landing, taxiing and take off. As the landing light 22 is arranged on the bottom of the aircraft 2, it is also shown in phantom.

It is pointed out that the exterior aircraft lights are shown highly schematically in FIG. 1. It is understood that the exterior aircraft lights are generally not square in shape, as depicted in FIG. 1, but have a lens cover structure that blends into the respective body portion of the aircraft. The squares of FIG. 1 are shown schematically in order to illustrate the approximate positions of the exterior aircraft lights.

Each of the described exterior aircraft lights has a lens cover structure, allowing for light emission therethrough and protecting the interior of the exterior aircraft light during the flight. All of the lens cover structures are exposed to the airstream during flight. Depending on the orientation of the exterior aircraft light and its extension from the remainder of the aircraft structure, the lens cover structures of the different exterior aircraft lights may be subject to different levels of degradation due to the airstream. It is possible that each of the depicted exterior aircraft lights or any subset of the depicted exterior aircraft lights has a cover according to exemplary embodiments of the invention, as described herein in detail.

Figure 2:
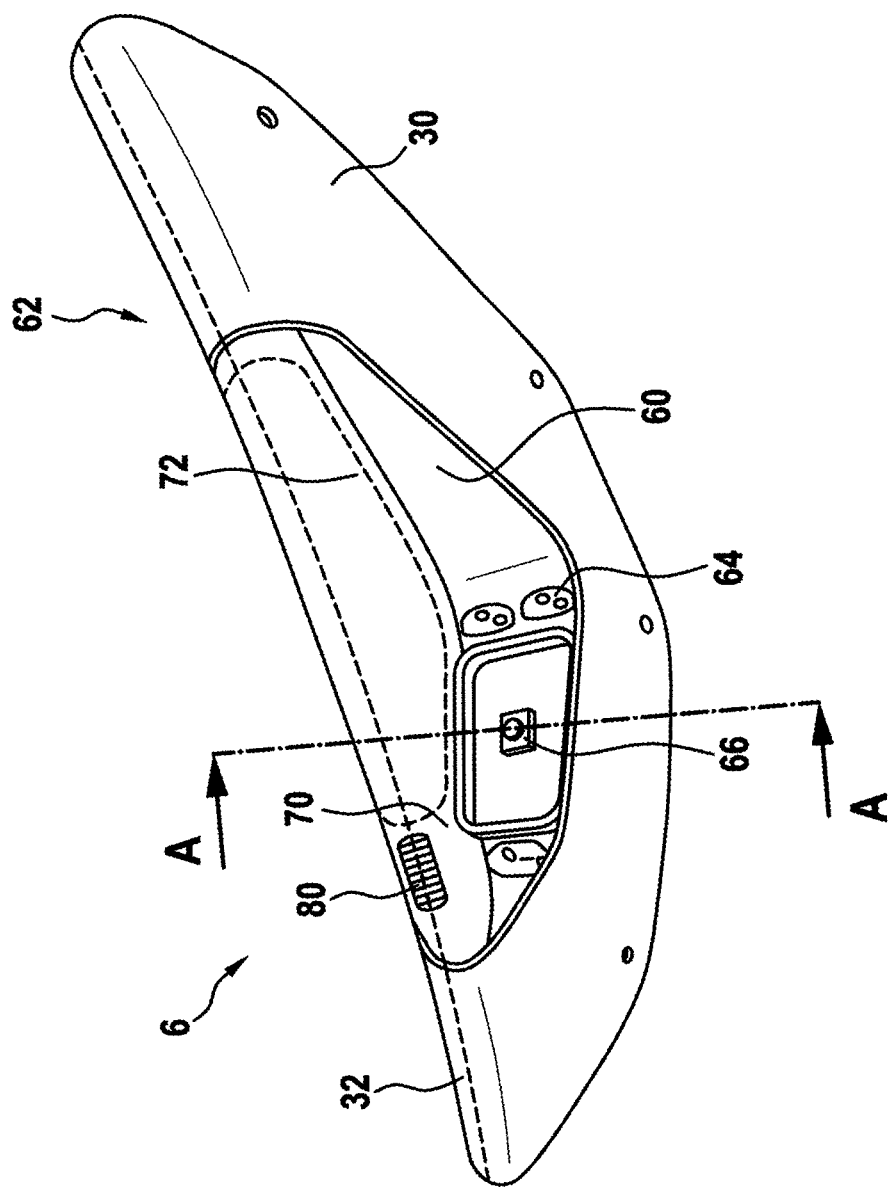
FIG. 2 shows an exterior aircraft light in accordance with an exemplary embodiment of the invention, equipped with a cover in accordance with an exemplary embodiment of the invention, in a perspective view.

FIG. 2 shows an exterior aircraft light 6 in accordance with an exemplary embodiment of the invention in a perspective, three-dimensional view. In the exemplary embodiment of FIG. 2, the exterior aircraft light 6 is a wing tip navigation light. It may also be a wing tip white-flashing anti-collision light or a combined wing tip navigation and white-flashing anti-collision light. For ease of illustration, a wing tip light having only navigation lighting functionality is depicted. The exterior aircraft light 6 is included into an airplane wing 30, in particular into a wing tip section of the airplane wing 30, a portion of which is depicted in FIG. 2.

The exterior aircraft light 6 has an exterior aircraft light housing 60 and a cover 62. Together, the exterior aircraft light housing 60 and the cover 62 define an interior space of the exterior aircraft light 6. The exterior aircraft light housing 60 has wing mounting elements 64, with which the exterior aircraft light 6 is attached to the wing 30 of the aircraft.

The exterior aircraft light 6 comprises a light source 66, which is a red or green LED in the exemplary embodiment of FIG. 2, and an optical system, which is not shown in FIG.

2 for ease of illustration. The light source 66 and the optical system are arranged and configured to create a desired output light intensity distribution for the navigation light of FIG. 2. It is understood that various different arrangements of one or more light sources and optical systems may be provided for different kinds of exterior aircraft lights.

The cover 62 has a lens cover structure 70 made of transparent material. The lens cover structure 70 has a shape that matches the exterior aircraft light housing 60 and the shape of the wing 30. The cover 62 further comprises a wear detector 80, attached to the inside of the lens cover structure 70. The wear detector 80 is depicted as having a striped pattern, visible from the outside of the lens cover structure. Exemplary wear detectors and contrasted patterns will be described below with respect to FIGS. 4 to 7.

The lens cover structure 70 is part of the aerodynamic structure of the airplane wing 30. In particular, the outer contour of the lens cover structure 70 is part of the air foil contour of the airplane wing 30. The lens cover structure 70 is curved around an aerodynamic front edge 32 of the airplane wing 30, which is shown as a dashed line along the lens cover structure 70 and the airplane wing 30. In use, the highest degradation of the lens cover structure 70 takes place at or around the aerodynamic front edge 32.

The lens cover structure 70 has a light emission portion 72. The light source 66 and the optical system are configured to direct the light emission of the exterior aircraft light 6 through the light emission portion 72. The wear indicator 80 is arranged outside of the light emission portion 72. In this way, the wear indicator 80 does not disturb the light emission of the exterior aircraft light 6. The wear indicator 80 can also be said to be arranged in a wear indication portion of the lens cover structure 70. With the wear indicator 80 being arranged around a portion of the aerodynamic front edge 32, the wear indicator is well-positioned to provide an early indication of the degradation of the lens cover structure 72.

Figure 3:
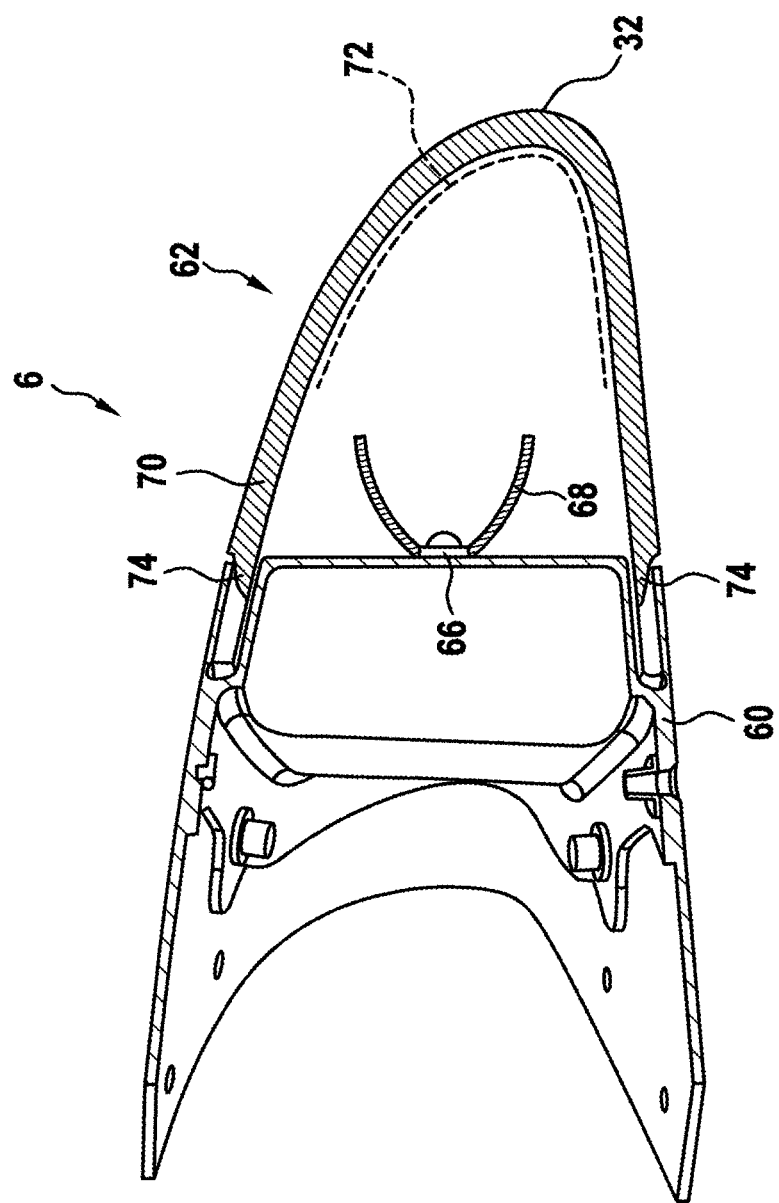
FIG. 3 shows the exterior aircraft light of FIG. 2 in a cross-sectional view.

FIG. 3 shows a cross-sectional view through the exterior aircraft light 6 of FIG. 2. The cross-sectional plane, depicted in FIG. 3, is indicated at A-A in FIG. 2. In contrast to FIG. 2, FIG. 3 shows the optical system 68 of the exterior aircraft light 6. In the exemplary embodiment of FIGS. 2 and 3, the optical system 68 is a free-form reflector, directing some of the light of the light source 66 into desired angular directions. As indicated above, the optical system 68 may have various different designs and may various optical components, such as one or more reflectors, one or more lenses, and one or more shutters. FIG. 3 further illustrates that the lens cover structure 70 has projections 74 for positioning the cover 62 with respect to the exterior aircraft light housing 60. The projections 74 are exemplary attachment elements.

Figure 4A:
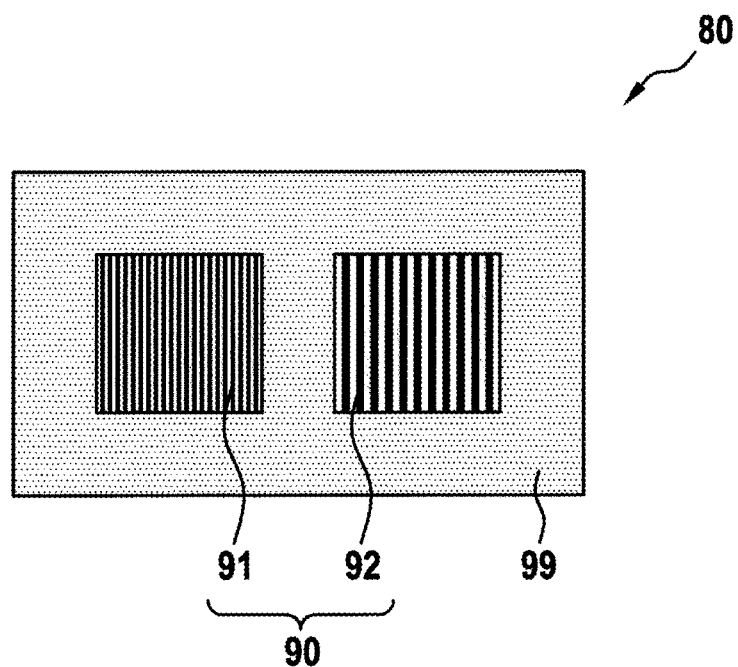
FIGS. 4A and 4B show different view of an exemplary wear indicator, to be used in a cover in accordance with exemplary embodiments of the invention.

FIG. 4A shows an exemplary wear indicator 80, which may be part of a cover for an exterior aircraft light in accordance with exemplary embodiments of the invention. The exemplary wear indicator 80 of FIG. 4A may for example be used as the wear indicator 80 shown in FIG. 2. The wear indicator 80 of FIG. 2 may also be in accordance with other exemplary embodiments of the wear indicator, as described herein.

The wear indicator 80 of FIG. 4A has a contrasted pattern 90. In the exemplary embodiment of FIG. 4A, the contrasted pattern 90 has a first pattern portion 91 and a second pattern portion 92. Each of the first and second pattern portions 91, 92 is a stripe pattern in the exemplary embodiment of FIG. 4A. Both the first pattern portion 91 and the second pattern portion 92 are depicted as stripe patterns of black and white stripes, with the individual stripes running vertically in the drawing plane of FIG. 4A. It is pointed out that other colors are possible as well and that other orientations of the stripes can also be used. The first and second pattern portions 91, 92 are arranged on a grey background 99, which surrounds both the first and second pattern portions 91, 92 and forms a space between the first and second pattern portions 91, 92. The combination of the first and second pattern portions 91, 92 and the grey background 99 has an overall rectangular shape.

As laid out above with respect to FIG. 2, the wear indicator 80 is attached to the inside of the lens cover structure 70. The wear indicator, as depicted in FIG. 4A, represents the perception through the non-degraded, transparent material of the lens cover structure 70.

When inspecting the state of wear of the lens cover structure, the inspecting person or the automatic test routine evaluates the lens cover structure in accordance with the following considerations. If both the first pattern portion 91 and the second pattern portion 92 are discernable as striped patterns through the lens cover structure, the degradation of the lens cover structure is non-critical, and the cover is good to be used. If the stripes of the first pattern portion 91, which have a smaller pitch than the stripes of the second pattern portion 92, are no longer discernable, while the stripes of the second pattern portion 92 are still discernable, the lens cover structure is getting into a state of substantial degradation that will require a maintenance action fairly soon. If both the stripes of the first pattern portion 91 and of the second pattern portion 92 are no longer discernable as stripes before the grey background 99, the lens cover structure is considered to no longer provide a safe light output, and the cover is to be replaced.

Figure 4B:
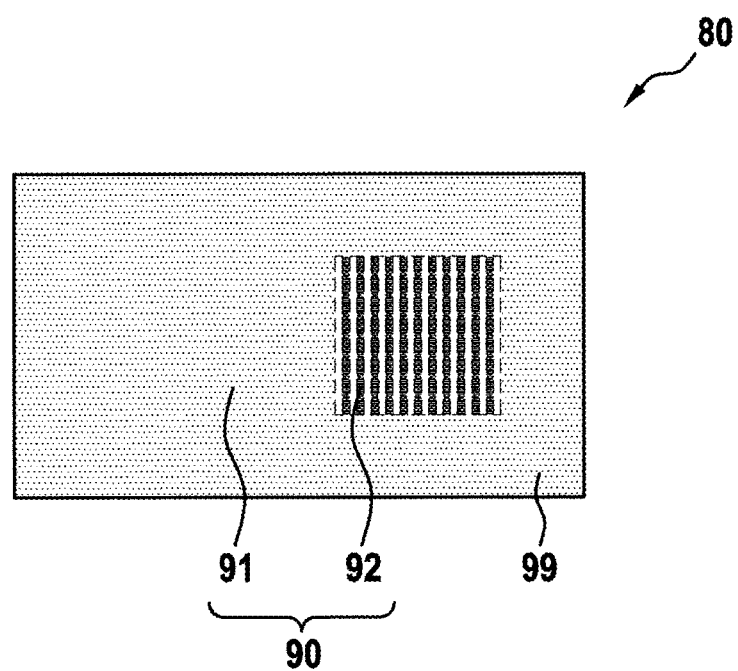

In FIG. 4B, a situation is depicted where the stripes of the first pattern portion 91 are no longer discernable and where the stripes of the second pattern portions 92 are hardly discernible. Accordingly, the degradation of the originally transparent material of the lens cover structure has gone so far that a replacement of the cover cannot be put off for much longer.

In an exemplary embodiment, the first pattern portion 91 of FIG. 4A may have a stripe pitch of 1 mm, while the second pattern portion 92 may have a stripe pitch of 2 mm. In a particular test scenario, where the thickness of the lens cover structure is predefined and the viewing distance to the lens cover structure is predefined, not being able to discern the stripes of the first pattern portion 91 may correspond to a loss of 30% of specular refraction and not being able to discern the stripes of the second pattern portion 92 may correspond to a loss of 50% of specular refraction of the lens cover structure. It is understood that, depending on the thickness of the lens cover, the viewing distance of the inspecting person, and the accepted level of degradation of the light output, contrasted patterns with suitable resolutions may be provided, in order to allow for a reliable and objective determination of the state of wear of the lens cover structure.

Figure 5:
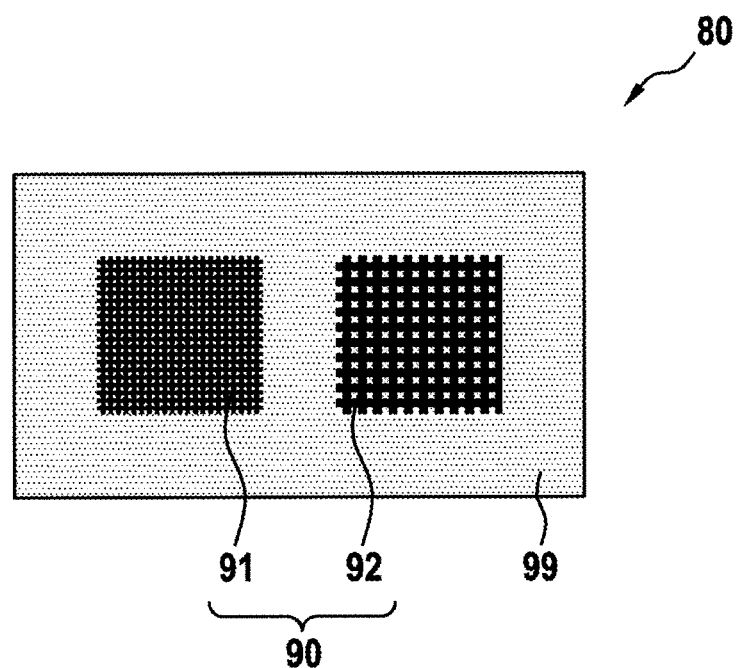
FIG. 5 shows another exemplary wear indicator, to be used in a cover in accordance with exemplary embodiments of the invention.

FIG. 5 shows another exemplary wear indicator 80 that can be used in a cover in accordance with exemplary embodiments of the invention. The wear indicator 80 of FIG. 5 is very similar to the wear indicator 80 of FIG. 4. The contrasted pattern 90 also has a first pattern portion 91 and a second pattern portion 92, which are arranged on a grey background 99. In the exemplary embodiment of FIG. 5, the first pattern portion 91 and the second pattern portion 92 are checkered patterns, in particular black and white checkered patterns. Again, the first pattern portion 91 and the second pattern portion 92 have different resolutions, the different resolutions being embodied by the different sizes of the individual squares of the checkered patterns in FIG. 5.

Figure 6A:
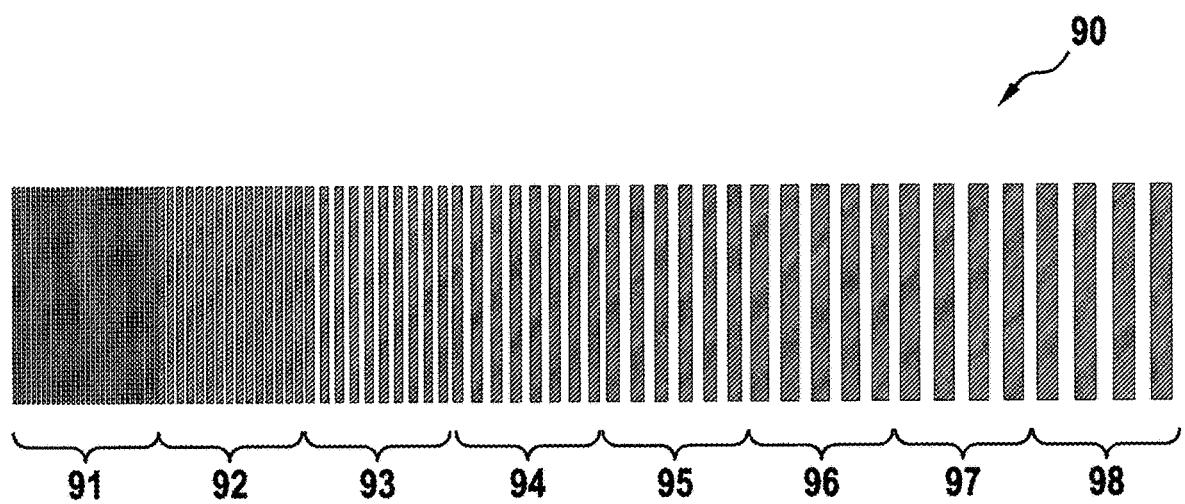
FIGS. 6A and 6B show different views of another exemplary contrasted pattern, to be used in a cover in accordance with exemplary embodiments of the invention.

FIG. 6A shows another exemplary contrasted pattern 90, which can be used in an exemplary wear indicator, which in turn may be used in a cover in accordance with exemplary embodiments of the invention. The contrasted pattern 90 has eight pattern portions 91, 92, 93, 94, 95, 96, 97, and 98. All of the eight pattern portions are stripe patterns, with each of the stripe patterns having a different pitch/line thickness. In particular, the first pattern portion has a smaller stripe width than the second pattern portion 92, which in turn has a smaller stripe width than the third pattern portion 93, which in turn has a smaller stripe width than the fourth pattern portion 94, which in turn has a smaller stripe width than the fifth pattern portion 95, which in turn has a smaller stripe width than the sixth pattern portion 96, which in turn has a smaller stripe width than the seventh pattern portion 97, which in turn has a smaller stripe width than the eighth pattern portion 98. With eight pattern portions of different resolutions given in the contrasted pattern 90, inspecting the blurriness of the individual pattern portions through the originally transparent material of the lens cover structure allows for making a more granular determination of the state of wear of the lens cover structure, as compared to the wear indicators with two pattern portions of FIGS. 4 and 5.

All of the stripe patterns of FIG. 6A comprise black and white stripes in alternating order. The black stripes are depicted in a hatched manner in FIG. 6.

Figure 6B:
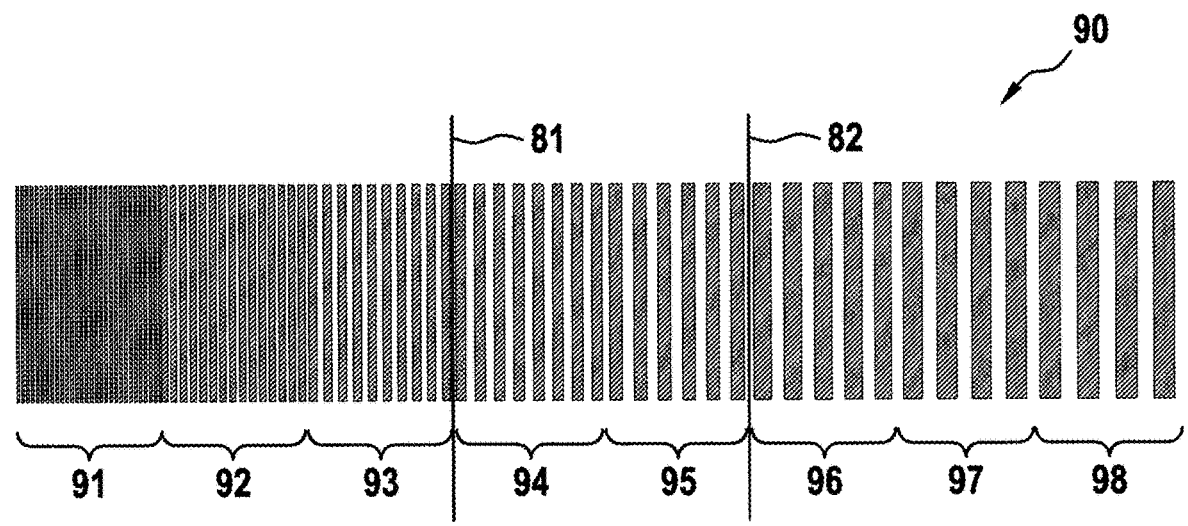

In FIG. 6B, a non-critical wear indication marker 81 and a maintenance indication marker 82 are shown, provided with the contrasted pattern 90 of FIG. 6A. The non-critical wear indication marker 81 and the maintenance indication marker 82 provide a visual aid to the inspecting person if the determined extent of blurriness is non-critical or mandates a replacement of the cover or something in between. In the exemplary embodiment of FIG. 6B, if the stripes of one more of the first to third pattern portions 91, 92, 93 are no longer discernible, but the other stripes of the other pattern portions are discernible, the degradation of the cover is still non-critical. On the other hand, if one or more of the stripes of the sixth to eighth pattern portions 96, 97, 98 are no longer discernible, which in generally also means that the stripes of the first to fifth pattern portions 91 to 95 are no longer discernible, a replacement of the cover is mandated. Further, if the stripes of the fourth and/or fifth pattern portions 94, 95 are no longer discernible, which usually also means that the stripes of the first to third pattern portions 91, 92, 93 are no longer discernible, but the stripes of the sixth to eighth pattern portions 96, 97, 98 are still discernible, the degradation of the lens cover structure is approaching a state where the cover needs to be replaced. This distinction between the underlying meanings of a blurred perception of the first to eighth pattern portions 91 to 98 is encoded in the non-critical wear indication marker 81 and the maintenance indication marker 82.

Figure 7A:
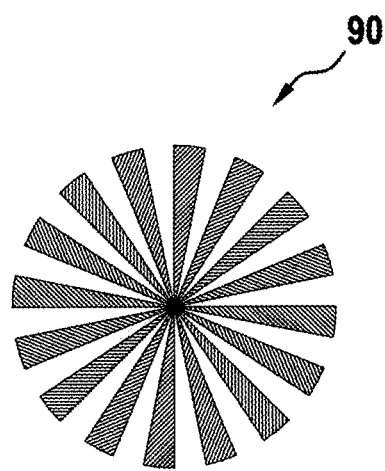
FIGS. 7A-7D show different views of yet another exemplary contrasted pattern, to be used in a cover in accordance with exemplary embodiments of the invention.

FIG. 7A shows another exemplary contrasted pattern 90, to be used in an exemplary wear indicator for a cover in accordance with exemplary embodiments of the invention. The contrasted pattern 90 of FIG. 7A is a so-called Siemens star. The Siemens star is a circular structure, having sectors of increasing width extending from the center of the circle to the circumference thereof. The sectors are black and white in alternating order. In this way, the Siemens star is a contrasted pattern, whose resolution increases radially from the center to the circumference. The Siemens star 90 of FIG. 7A is depicted as seen through the originally transparent material of the lens cover structure, thus showing the Siemens star in a fully unblurred state. The black sectors are again depicted in a hatched manner.

Figure 7B:
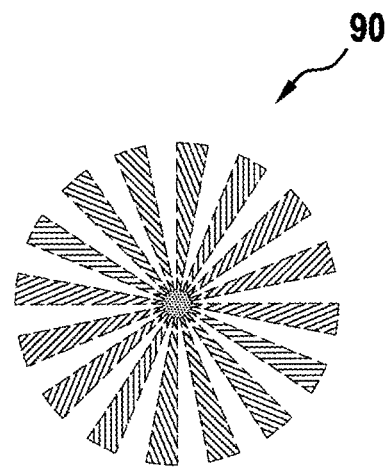

FIG. 7B shows the Siemens star of FIG. 7A as seen behind a slightly degraded lens cover structure. In a small region around the center of the Siemens star 90, the black and white sectors are no longer discernable from each other. However, as the blurriness only prevents the high resolution portion of the Siemens star 90 to be blurred, the lens cover structure is still deemed to be in a non-critical state of wear.

Figure 7C:
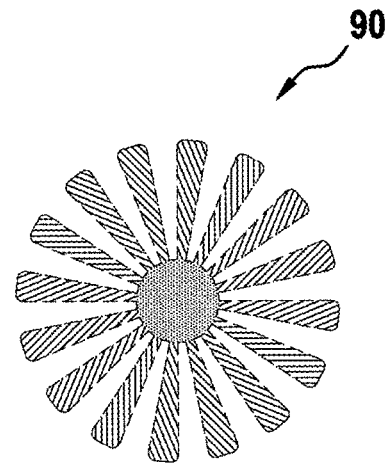

FIG. 7C depicts the Siemens star 90 as seen behind a lens cover structure that is substantially more degraded. As compared to FIG. 7B, the pattern elements of the Siemens star 90 of FIG. 7C are no longer discernable over a significantly larger area around the center. Such an extent of blurriness may be considered to indicate that the cover is to be replaced or approaches a state of wear that mandates replacement.

Figure 7D:
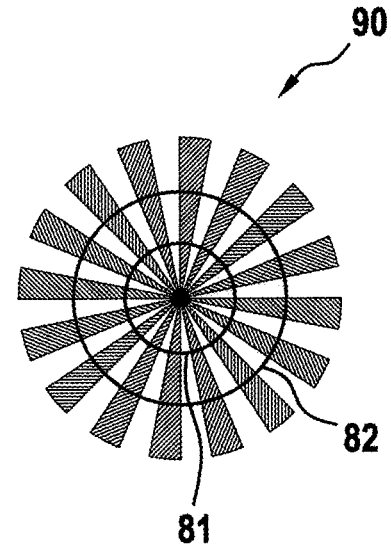

FIG. 7D shows the Siemens star 90 of FIG. 7A with a non-critical wear indication marker 81 and a maintenance indication marker 82. As described before, these markers provide a visual aid for making a decision with respect to the maintenance of the cover. In the case of the Siemens star 90, the non-critical wear indication marker 81 and the maintenance indication marker 82 are concentric circles, with the non-critical wear indication marker 81 having a smaller radius then the maintenance indication marker 82.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An exterior aircraft light, comprising:
   an exterior aircraft light housing;
   at least one light source, arranged within the exterior aircraft light housing;
   an optical system, configured for conditioning a light output of the exterior aircraft light from light emitted by the at least one light source;
   a lens cover structure, attachable to the exterior aircraft light housing and configured to close the exterior aircraft light housing, wherein the lens cover structure has an inside and an outside and is at least partially made of transparent material; and
   a wear indicator, comprising a contrasted pattern visible from the outside of the lens cover structure through the transparent material,
   wherein the contrasted pattern comprises a first pattern portion of a first resolution and a second pattern portion of a second resolution, with individual pattern elements of the first pattern portion differing in extension from individual pattern elements of the second pattern portion.

2. The exterior aircraft light according to claim 1, wherein the contrasted pattern comprises at least one of a stripe pattern, a checkered pattern, and a Siemens star pattern.

3. The exterior aircraft light according to claim 1, wherein the contrasted pattern is a repetitive pattern.

4. The exterior aircraft light according to claim 1, wherein the wear indicator has a maintenance indication marker, marking the first portion of the contrasted pattern, having the first resolution.

5. The exterior aircraft light according to claim 4, wherein the wear indicator has a non-critical wear indication marker, marking the second portion of the contrasted pattern, having the second resolution.

6. The exterior aircraft light according to claim 1, wherein the contrasted pattern comprises a first stripe pattern, having stripes of a first line thickness, and a second stripe pattern, having stripes of a second line thickness, the second line thickness being larger than the first line thickness.

7. The exterior aircraft light according to claim 1, wherein the contrasted pattern is a black and white pattern, with the black and white pattern in particular being arranged on a grey background.

8. The exterior aircraft light according to claim 1, wherein the wear indicator has an extension of between 2 cm and 10 cm.

9. The exterior aircraft light according to claim 1, wherein the wear indicator is a sticker adhered to the inside of the lens cover structure.

10. The exterior aircraft light according to claim 1, wherein the at least one light source and the optical system are arranged to direct light from the at least one light source through a light emission portion of the transparent material of the lens cover structure and wherein the wear indicator is attached to a wear indication portion of the transparent material of the lens cover structure, different from the light emission portion.

11. The exterior aircraft light according to claim 1, wherein the exterior aircraft light is one of: a wing tip navigation light; a wing tip white-flashing anti-collision light; a landing light; a runway turn-off light; a taxi light; a take-off light; and a red-flashing beacon light.

12. A method of determining a wear state of a lens cover structure of an exterior aircraft light, the method comprising:
inspecting the lens cover structure from its outside;
determining an extent of blurriness of a contrasted pattern of a wear indicator, which is visible through the lens cover structure from its outside, wherein the contrasted pattern comprises a first pattern portion of a first resolution and a second pattern portion of a second resolution, with individual pattern elements of the first pattern portion differing in extension from individual pattern elements of the second pattern portion; and
determining the wear state of the lens cover structure on the basis of the extent of blurriness of the contrasted pattern, wherein determining the wear state of the lens cover structure in particular comprises making a decision whether the lens cover structure is to be replaced.

13. The method according to claim 12, wherein the contrasted pattern comprises a stripe pattern and wherein the step of determining an extent of blurriness of the contrasted pattern comprises determining whether individual stripes of the stripe pattern are discernible at a predefined distance from the lens cover structure.

14. A set of components of an exterior aircraft light, the set comprising:
a lens cover structure, attachable to an exterior aircraft light housing and configured to close the exterior aircraft light housing, wherein the lens cover structure has an inside and an outside and is at least partially made of transparent material; and
a wear indicator, comprising a contrasted pattern visible from the outside of the lens cover structure through the transparent material, wherein the contrasted pattern comprises a first pattern portion of a first resolution and a second pattern portion of a second resolution, with individual pattern elements of the first pattern portion differing in extension from individual pattern elements of the second pattern portion.

15. The set of components of an exterior aircraft light according to claim 14, wherein the contrasted pattern comprises at least one of a stripe pattern, a checkered pattern, and a Siemens star pattern.

16. The set of components of an exterior aircraft light according to claim 14, wherein the contrasted pattern is a repetitive pattern.

17. The set of components of an exterior aircraft light according to claim 14, wherein the wear indicator has a maintenance indication marker, marking the first portion of the contrasted pattern, having the first resolution.

18. The set of components of an exterior aircraft light according to claim 14, wherein the contrasted pattern comprises a first stripe pattern, having stripes of a first line thickness, and a second stripe pattern, having stripes of a second line thickness, the second line thickness being larger than the first line thickness.

* * * * *